(12) United States Patent
Endo et al.

(10) Patent No.: US 8,017,659 B2
(45) Date of Patent: Sep. 13, 2011

(54) PROTON CONDUCTIVE POLYMER ELECTROLYTE AND FUEL CELL INCLUDING THE SAME

(75) Inventors: Hiroko Endo, Kanagawa-ken (JP); Hiroyuki Nishide, Tokyo (JP); Atsuo Sonai, Kanagawa-ken (JP); Takahiro Tago, Tokyo (JP); Teruyuki Okayasu, Tokyo (JP)

(73) Assignee: Samsung SDI Co., Ltd., Yongin-si (KR)

( * ) Notice: Subject to any disclaimer, the term of this patent is extended or adjusted under 35 U.S.C. 154(b) by 800 days.

(21) Appl. No.: 11/940,440

(22) Filed: Nov. 15, 2007

(65) Prior Publication Data
US 2008/0118807 A1  May 22, 2008

(30) Foreign Application Priority Data
Nov. 16, 2006 (JP) .................................. 2006-310239
Sep. 28, 2007 (KR) .................................. 2007-98372

(51) Int. Cl.
C08J 5/20 (2006.01)
H01M 8/10 (2006.01)

(52) U.S. Cl. ............ 521/25; 521/27; 429/482; 429/492; 429/493; 429/535

(58) Field of Classification Search .................... 521/25, 521/27; 429/33, 482, 492, 493, 535
See application file for complete search history.

(56) References Cited

FOREIGN PATENT DOCUMENTS
JP 11-502245 2/1999
WO WO 96/29359 9/1996

OTHER PUBLICATIONS

Kobayashi et al. "Proton-conducting Polymers Derived from Poly(ether-etherketone) and Poly(4-phenoxybenzoyl-1, 4-phenylene)." Solid State Ionics, vol. 106, 1998, pp. 219-225.

*Primary Examiner* — Duc Truong
(74) *Attorney, Agent, or Firm* — Christie, Parker & Hale, LLP

(57) ABSTRACT

A proton conductive polymer electrolyte includes an acidic functional group-containing aromatic hydrocarbon polymer and an electron donor functional group-containing compound. When used in a fuel cell, the proton conductive polymer electrolyte provides a long-term stable power generating performance at an operating temperature from 100° C. to 200° C. in non-humidified conditions or a relative humidity of 50% or less.

17 Claims, 3 Drawing Sheets

PROTON CONDUCTIVE POLYMER ELECTROLYTE AND FUEL CELL INCLUDING THE SAME

CROSS-REFERENCE TO RELATED APPLICATIONS

This application claims the benefits of Japanese Patent Application No. 2006-310239, filed Nov. 16, 2006, in the Japanese Intellectual Property Office, and Korean Application No. 2007-98372, filed Sep. 28, 2007, in the Korean Intellectual Property Office, the disclosures of which are incorporated herein in its entirety by reference.

BACKGROUND OF THE INVENTION

1. Field of the Invention

Aspects of the present invention relate to a proton conductive polymer electrolyte and a fuel cell including the same, and more particularly, to a solid polymer-type fuel cell stably performing for a long period of time even at an operational temperature from 100° C. to 200° C. in non-humidified conditions or a relative humidity of 50% or less.

2. Description of the Related Art

In general, fluorinated polyethylene sulfonic acid membranes are used in common salt electrolysis, a desalinization process of sea water, and water treatment, and in addition, are used as an electrolyte for a fuel cell due to its high proton conductivity and high chemical stability. Examples of commercially available fluorinated polyethylene sulfonic acid membranes include NAFION membranes, FLEMION membranes, ACIPLEX membranes, and DOW membranes.

However, these electrolytes are not environmentally friendly since they include fluorine, and are also expensive.

There are electrolytes which do not include fluorine. Examples of such electrolytes include a polystyrene sulfonic acid used as an ion exchange resin or ion exchange membrane for use in a water treatment, and a sulfonic acid aromatic polymer for use in a fuel cell (refer to Japanese Patent Publication No. hei11-502245, T. Kobayashi, M. Rikukawa, K. Sanui, N. Ogata, Solid State Ionics, 106 vol., 1998, p. 219).

However, such electrolytes are not suitable for use in fuel cells due to their heat resistance and chemical instability.

Non-aqueous proton conductive electrolytes also exist. Such non-aqueous proton conductive electrolytes can be prepared by combining a non-volatile and room temperature-molten salt, a phosphoric acid, or a low molecular weight molecule, such as imidazole, with a heat-resistant polymer. In this state, the non-volatile and room temperature-melting salt, phosphoric acid, and low molecular weight molecule, such as imidazole, act as a proton acceptor or a carrier. Most non-aqueous proton conductive electrolytes, however, are soluble with respect to water and thus can leak out of a fuel cell due to water that is generated when the fuel cell operates.

SUMMARY OF THE INVENTION

According to aspects of the present invention, a compound having a specific electron donor group which can be a proton acceptor, such as a room temperature-molten salt or a phosphoric acid, and which is not dissolvable in water is used together with a heat-resistant polymer to prepare an electrolyte for a fuel cell operating in non-humidified conditions at high temperature.

Aspects of the present invention provide a proton conductive polymer electrolyte providing a long-term stable power generating performance at an operation temperature from 100° C. to 200° C. in non-humidified conditions or a relative humidity of 50% or less and a fuel cell including the proton conductive polymer electrolyte.

According to an embodiment of the present invention, there is provided a proton conductive polymer electrolyte including a composition at least including an acidic functional group-containing aromatic hydrocarbon polymer and an electron donor functional group-containing compound.

In the proton conductive polymer electrolyte according to an aspect of the present invention, the electron donor functional group-containing compound has an amount from 0.01 to 50 parts by weight based on 100 parts by weight of the acidic functional group-containing aromatic hydrocarbon polymer.

In the proton conductive polymer electrolyte according to an aspect of the present invention, the electron donor functional group-containing compound has a melting point of 100° C. or more, specifically 110-130° C., and a boiling point of 200° C. or less, specifically 160 to 190° C. The acidic functional group may be a sulfonic acid group or a sulfamic acid group.

According to an aspect of the present invention, the acidic functional group-containing aromatic hydrocarbon polymer may be a polyamidic acid derivative represented by Formula 1.

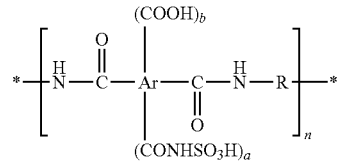

[Formula 1]

where Ar is an aromatic ring or an aromatic ring-containing functional group; R is a C1-C20 alkylene group; $0<a\leq2$ and $0\leq b<2$ where $a+b=2$; and n denotes an average polymerization degree and is an integer between 100 and 10000.

According to another embodiment of the present invention, there is provided a method of forming a proton conductive polymer electrolyte membrane comprising dissolving an acidic functional group-containing aromatic hydrocarbon polymer in a solvent to form a polymer solution; adding an electron donor functional group-containing compound to the polymer solution to obtain a mixed solution; casting the mixed solution to form a membrane; and removing the solvent from the membrane According to another embodiment of the present invention, there is provided a fuel cell including a pair of electrodes and an electrolyte interposed between the electrodes, wherein the electrolyte is the proton conductive polymer electrolyte.

In the fuel cell according to an aspect of the present invention, the electrode includes the proton conductive polymer electrolyte described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
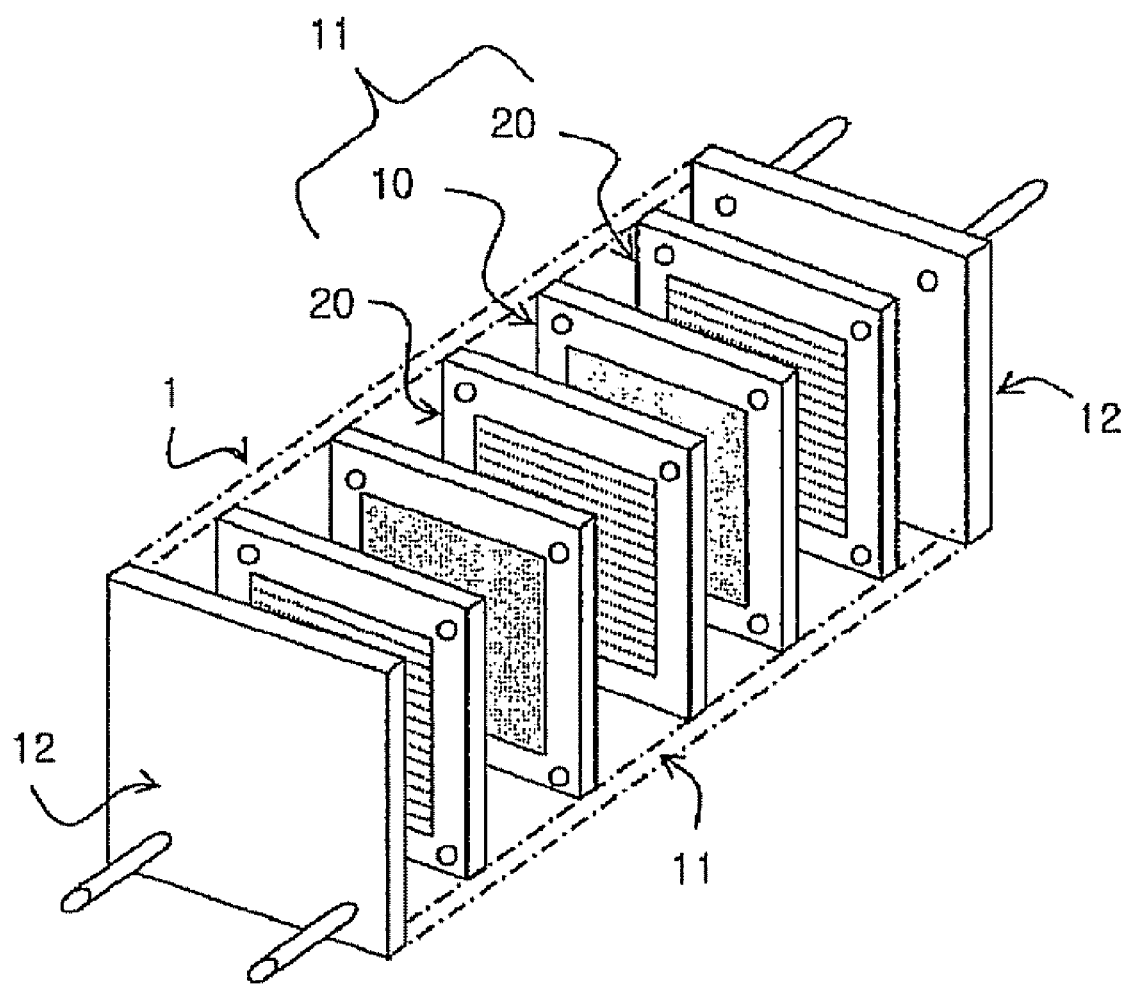
FIG. 1 is an exploded perspective view of a primary component of a fuel cell according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

[Proton Conductive Polymer Electrolyte]

A proton conductive polymer electrolyte according to aspects of the present invention includes an acidic functional group-containing aromatic hydrocarbon polymer and an electron donor functional group-containing compound.

(Aromatic Hydrocarbon Polymer)

In the acidic functional group-containing aromatic hydrocarbon polymer, the acidic functional group can be a functional group capable of emitting protons, such as, for example, a carboxylic group, a phosphonic acid group, a sulfonic acid group, or a sulfamic acid group. As a non-limiting example, the acidic functional group can be a sulfonic acid group, a carboxylic group, or a sulfamic acid group. As a more specific, non-limiting example, the acidic functional group can be a sulfonic acid group or a sulfamic acid group.

A sulfamic acid group-containing aromatic hydrocarbon polymer can be a polyamidic acid derivative represented by Formula 1.

[Formula 1]

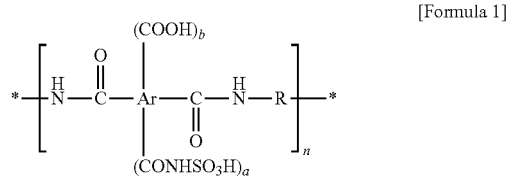

where Ar is an aromatic ring or an aromatic ring-containing functional group; R is a C1-C20 alkylene group, such as, for example, a C3-C12 alkyl group; a and b represent a per monomer average of the designated side chains in the polymer wherein $0<a\leq2$ and $0\leq b<2$ where $a+b=2$; and n denotes an average polymerization degree and can be an integer between 100 and 10000.

The aromatic ring or aromatic ring-containing functional group can be a phenyl group or a naphthyl group, but is not limited thereto.

The average polymerization degree of the polyamidic acid derivative may be in the range from 100-10000. When the average polymerization degree of the polyamidic acid derivative is less than 100, an electrolyte including such a polyamidic acid derivative may not be formed in a membrane. On the other hand, when the average polymerization degree of the polyamidic acid derivative is more than 10000, the polyamidic acid derivative may not dissolve in a solvent, making it difficult to combine the polyamidic acid with an electron donor functional group-containing compound and to cast the combined polyamidic acid and electron donor functional group-containing compound to form a membrane.

The polyamidic acid derivative can be obtained by partially or entirely sulfamidizing a carboxylic group that is a side chain of the polyamidic acid. Such a polyamidic acid derivative can be prepared by partially or entirely acid-chlorinating the carboxylic group that is the side chain of the polyamidic acid, reacting the resultant product with sulfamic acid triethylamine salt, and then subjecting the resultant product to a cation exchange process.

In Formula 1, a and b represent a per monomer average representing the degree to which the carboxylic acid side chain is sulfamidized. For example, if a=2 and b=0, all of the side chains of the polyamidic acid derivative are sulfamidized, whereas if a=1 and b=1, half of the side chains are sulfamidized and half of the side chains remain as carboxylic acid groups. Since a and b are calculated as per monomer averages, a and b can range from 0 to 2 such that $0<a\leq2$ and $0\leq b<2$ where $a+b=2$. A functional group introduction rate (a/b) of the polyamidic acid derivative represented by Formula 1 may be in the range from 80%-100%. When the functional group introduction rate (a/b) is less than 80%, sufficient proton conductivity may not be obtained.

When the sulfamic acid group is introduced to a side chain of a polyamide at a high introduction rate, the electrolyte formed therefrom can have a low flexibility and can be weak. Therefore, according to aspects of the present invention, a polyamidic acid derivative containing an alkylene group is introduced to a main chain of the polyamide so that even when the sulfamic acid group is introduced at a high rate, the electrolyte formed therefrom can have a high flexibility, and thus, damage to the electrolyte can be prevented.

A method of synthesizing the polyamidic acid derivative will now be described in detail.

When the polyamidic acid derivative is a sulfamidized polyamide sulfamic acid, in consideration of synthesis easiness, a carboxylic group, that is, a side chain of the polyamidic acid can be sulfamidized. Specifically, a carboxylic group, that is, a side chain of the polyamidic acid is acid-chlorinated, and then the resultant product is reacted with a sulfamic acid triethylamine salt and subjected to a cation exchanging process.

For example, the polyamide sulfamic acid can be synthesized according to Reaction Scheme 1.

[Reaction Scheme 1]

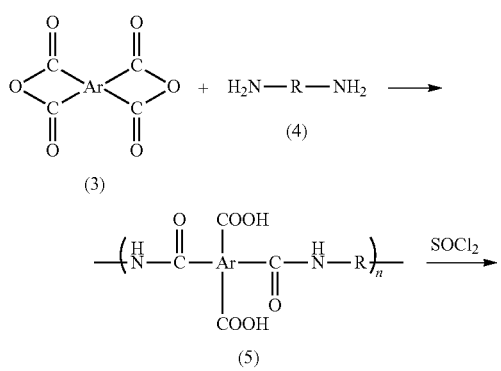

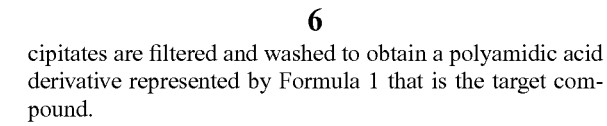

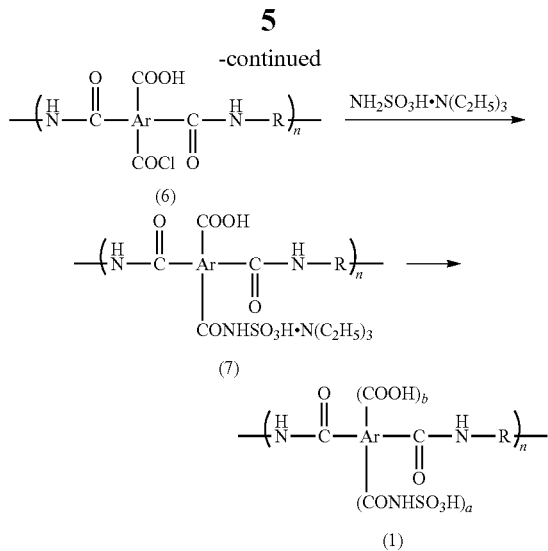

Referring to Reaction Scheme 1, a polyamidic acid 5 acting as a starting material can be prepared by, for example, polymerizing and condensing an aromatic tetraacetic dianhydride 3 and an aromatic diamine 4. In Compounds 3, 4, and 5, Ar, R, and n are the same as in Compound 1, which is the target product represented by Formula 1.

The polyamidic acid 5 and thionyl chloride ($SOCl_2$) are stirred and mixed in an amide-based solvent at room temperature or a low temperature for a few to 24 hours. As a result, the carboxylic acid side chain of the polyamidic acid 5 is entirely or at least partially changed into an acid chloride group (acid chlorination) to provide an acid chlorinated polymer 6. In the acid chlorinated polymer 6, only one of the carboxylic acid side chains of the polyamidic acid 5 may be changed into an acid chloride group, and the other carboxylic acid side chain may remain unchanged. However, it is to be understood that both carboxylic acid side chains may be changed into an acid chloride group. Moreover, the extent of acid chlorination may vary from one monomer to another in the acid chlorinated polymer 6. The amide-based solvent used in the acid chlorination can be N,N'-dimethylacetamide or N,N'-dimethylformamide, as non-limiting examples. After the acid chlorination is complete, the reaction solution is added to methanol and the resultant precipitations are filtered and washed to separate the acid chlorinated polymer 6.

The acid chlorinated polymer 6 is stirred and mixed with an amido sulfuric acid triethylamine salt ($NH_2SO_3H \cdot N(C_2H_5)_3$) in an amide-based solvent at room temperature or a low temperature for a few to 24 hours to produce a polyamide sulfamic acid triethylamine salt 7. In the polyamide sulfamic acid triethylamine salt 7, only the one side chain that is acid-chlorinated as a result of the reaction described above is changed into a sulfamic acid salt. However, if both carboxylic acid side chains are acid-chlorinated as described above, both side chains may be changed into a sulfamic acid salt. The amide-based solvent used can be the same as in the acid chlorination reaction. After the reaction is complete, the reaction solution is added to methanol and the resultant precipitations are filtered and washed to separate the polyamide sulfamic acid triethylamine salt 7.

Finally, a solution of the polyamide sulfamic acid triethylamine salt 7, such as, for example, a solution in N,N'-dimethylacetamide, is passed through a cation exchange resin for a cation exchanging to convert the sulfamic acid salts into sulfamic acid and protonization. The treated solution is added to methanol, dichloromethane, or chloroform, and the precipitates are filtered and washed to obtain a polyamidic acid derivative represented by Formula 1 that is the target compound.

The polyamidic acid derivative represented by Formula 1 prepared according to an embodiment of the present invention has a structure in which, as a result of the reactions described above, a sulfamic acid is introduced to one of the side chains of the polyamidic acid. However, the reaction with respect to the side chains of the polyamidic acid is not limited as described above. That is, the polyamidic acid can be entirely changed, in addition to partially changed, into a sulfamic acid. Moreover, the number of side chains that are changed into a sulfamic acid can vary from one monomer to another.

An aromatic hydrocarbon polymer having a sulfonic acid group can be a polyetheretherketone derivative represented by Formula 2.

[Formula 2]

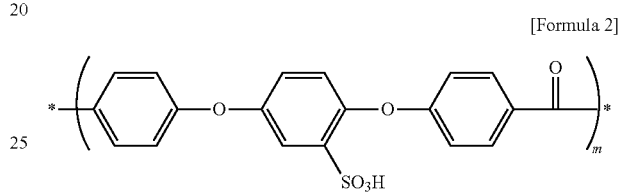

where m denotes an average polymerization degree and ranges from 100 to 10000.

When the average polymerization degree is less than 100, an electrolyte including the polyetheretherketone derivative may not be formed in a membrane. On the other hand, if the average polymerization degree is greater than 10000, the polyetheretherketone derivative may not dissolve in a solvent, and it may not be possible to cast the polyetheretherketone derivative to form a membrane.

The acidic functional group-containing aromatic hydrocarbon polymer can also be a heat-resistant polymer, such as polyetherketone, polyether-sulfone, polyphenylene ether, polyphenylenesulfide, polyimide, or polybenzoxazole.

(Electron Donor Functional Group-Containing Compound)

The term "electron donor functional group" (or "electron donating group") refers to a functional group in which its specific portion has high electronic density due to a difference in electronegativity, a resonance effect, and an induced effect and that donates electrons to a corresponding partner. As such, the specific portion having high electron density reacts with dissociable protons of an acidic functional group of the acidic functional group-containing aromatic hydrocarbon polymer, and protons move to the electron donor functional group in the system to express proton conductivity.

The electron donor functional group-containing compound may be a compound that exists in a liquid phase at an operation temperature of a fuel cell, such as, for example, at a temperature from 100° C. to 200° C. Specifically, the electron donor functional group-containing compound may have a melting point of 100° C. or higher, such as, for example, from 110 to 130° C., and a boiling point of 200° C. or less, such as, for example from 160 to 190° C. As non-limiting examples, the electron donor functional group can be an amide group, an ether group, an amino group, a hydroxyl group, a thioether group, a C1-C20 alkyl group, or a halogen group.

As non-limiting examples, the electron donor functional group-containing compound can be decyl amine, undecyl amine, dodecyl amine, tridecyl amine, tridodecyl amine, pentadecyl amine, decylaniline, 4-butylaniline, 1-decanol, 2-decanol, 1-undecanol, 1-dodecanol, 2-dodecanol, 1-tridecanol, 1-tetradecanol, 2-tetradecanol, 2-hexadecanol, 2-hexyl-1-decanol, heptadecanol, 1,10-decandiol, 1,2-decandiol, 1,12-dodecandiol, 1,2-tetradecandiol, 1,14-tetradecandiol, 1-decanthiol, 1-undecanthiol, or 1-pentadecanthiol.

As additional non-limiting examples, the electron donor functional group can be an amide group or ether group, and the electron donor functional group-containing compound can be diethyl dodecanoic acid amide, diethyl octadecanoic acid amide, diethyl benzamide, diethyl-4-heptylbenzamide, diphenylether, ethylphenylether, or cyclohexylphenylether.

In a proton conductive polymer electrolyte according to aspects of the present invention, the electron donor functional group-containing compound is combined with the aromatic hydrocarbon polymer. Specifically, the aromatic hydrocarbon polymer and the electron donor functional group-containing compound are homogenously mixed together.

The amount of the electron donor functional group-containing compound may be in the range from 0.01 to 50 parts by weight based on 100 parts by weight of the acidic functional group-containing aromatic hydrocarbon polymer. When the mixture ratio of the electron donor functional group-containing compound is less than 0.01 parts by weight, sufficient proton conductivity may not be obtained. On the other hand, when the mixture ratio of the electron donor functional group-containing compound is more than 50 parts by weight, the strength of the membrane may be reduced.

According to a method of preparing a proton conductive polymer electrolyte according to an embodiment of the present invention, an aromatic hydrocarbon polymer is dissolved in a solvent to obtain a polymer solution, an electron donor functional group-containing compound is added to the polymer solution to obtain a mixed solution, and then the mixed solution is cast to form a membrane and then heated, decompressed, or thermally decompressed to remove the solvent.

The solvent that dissolves the aromatic hydrocarbon polymer can be, for example, dimethylformamide (DMF), N,N'-dimethylacetamide (DMAc), N-methylpyrrolidone (NMP), or dimethylsulfoxide (DMSO) when the aromatic hydrocarbon polymer is the polyamidic acid derivative.

[Fuel Cell]

Figure 2:
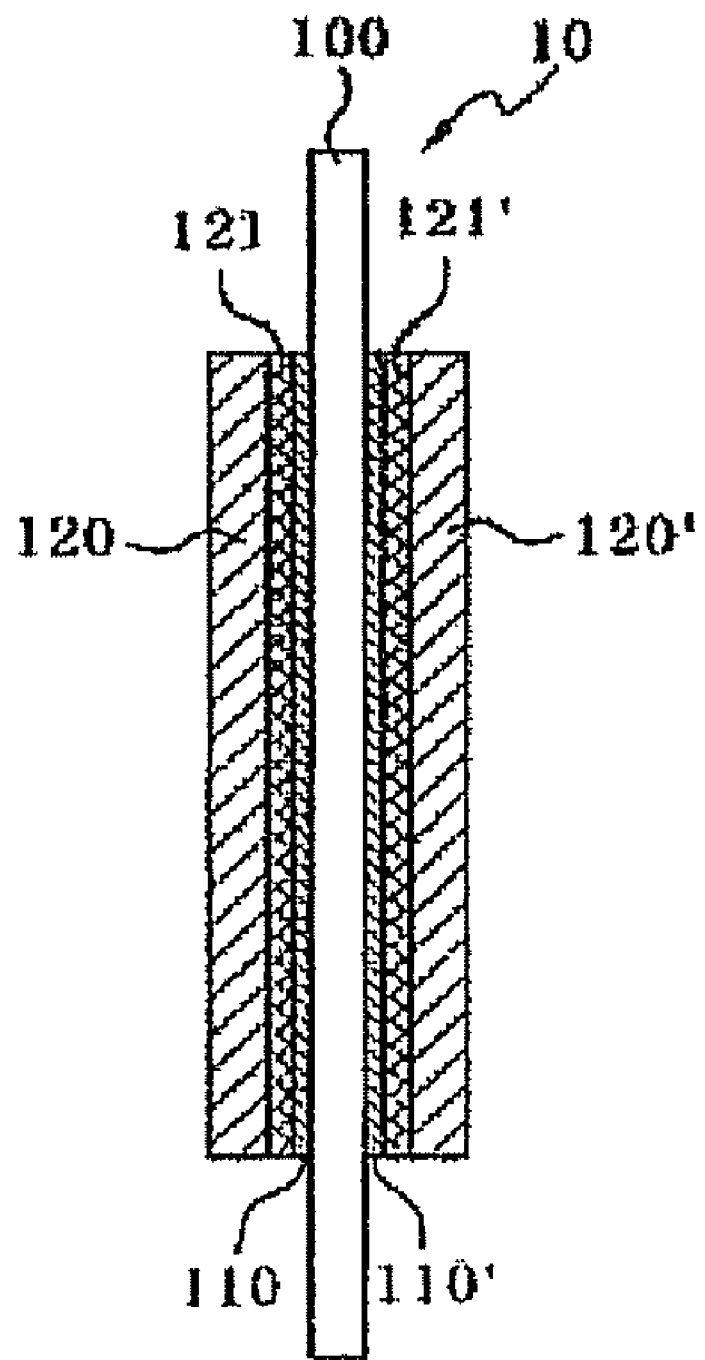
FIG. 2 is a sectional schematic view of a membrane-electrode assembly of the fuel cell of FIG. 1.

FIG. 1 is a perspective exploded view of a fuel cell 1 according to an embodiment of the present invention. FIG. 2 is a schematic and sectional view of a membrane-electrode assembly of the fuel cell of FIG. 1.

Referring to FIG. 1, the fuel cell 1 includes two unit cells 11 interposed between a pair of holders 12. Each unit cell 11 includes a membrane-electrode assembly 10 and two bipolar plates 20 respectively disposed at sides of the membrane-electrode assembly 10 in a thickness direction of the membrane-electrode assembly 10. The unit cell 11 operates at an operation temperature from 100° C. to 200° C. in non-humidified conditions or a relative humidity of 50% or less. The bipolar plates 20 may be formed of a conductive metal or carbon, and each bipolar plate 20 contacts the membrane-electrode assembly 10 so that the bipolar plates 20 function as a current collector and provide oxygen and a fuel to catalyst layers of the membrane-electrode assembly 10.

Although the fuel cell 1 is illustrated in FIG. 1 to include two unit cells 11, the number of the unit cells 11 is not limited thereto. For example, according to desired properties for a fuel cell, the number of unit cells can be increased to a few or a few hundreds.

Referring to FIG. 2, the membrane-electrode assembly 10 includes an electrolyte 100, catalyst layers 110 and 110' disposed at sides of the electrolyte 100 in a thickness direction of the electrolyte 100, first gas diffusion layers 121 and 121' respectively deposited on the catalyst layer 110 and 110', and second gas diffusion layers 120 and 120' respectively deposited on the first gas diffusion layers 121 and 121'.

The electrolyte 100 may be formed of the proton conductive polymer electrolyte as described above, that is, a composition at least including an acidic functional group-containing aromatic hydrocarbon polymer and an electron donor functional group-containing compound. The thickness of the electrolyte 100 may range from 20 μm to 200 μm.

The catalyst layers 110 and 110' function as a fuel electrode and an oxygen electrode, respectively. Each of the catalyst layers 110 and 110' includes a catalyst primarily formed of an active carbon and a binder that forms the catalyst in a solid state. The catalyst includes a catalyst material supported by an active carbon. The catalyst material may be any metal that facilitates oxidation of hydrogen and reduction of oxygen. For example, the catalyst material can be Pb, Fe, Mn, Co, Cr, Ga, V, W, Ru, Ir, Pd, Pt, Rh, or an alloy thereof. The catalyst can be prepared by supporting these metals or alloys with the active carbon.

The binder can be a fluorine resin having high heat resistance, or can have the same composition as the proton conductive polymer electrolyte according to aspects of the present invention. When a binder having the same composition as a proton conductive polymer electrolyte is used, protons may be efficiently diffused in the catalyst layers 110 and 110', and impedance of the catalyst layers 110 and 110' may be reduced. As a result, the output power of the fuel cell is increased.

When a fluorine resin is used as a binder, the fluorine resin may have a melting point of 400° C. or lower. Such a fluorine resin can be a hydrophobic and heat-resistant resin, such as, for example, polytetrafluoroethylene, tetrafluoroethylene-perfluoroalkylvinylether copolymer, polyfluorovinylidene, tetrafluoroethylene-hexafluoroethylene copolymer, or perfluoroethylene. If such a hydrophobic binder is used, excess wetting of the catalyst layers 110 and 110' by water generated when a fuel cell operates can be prevented, and the inhibition of diffusion of a fuel gas and oxygen in the fuel electrode and the oxygen electrode caused by the presence of water can be prevented.

A conducting agent can be added to the catalyst layers 110 and 110'. The conducting agent can be any material that is electrically conductive, such as a metal or a carbonaceous material. For example, the conducting agent can be carbon black, such as, for example, acetylene black, an active carbon, graphite, or a combination thereof.

The first gas diffusion layers 121 and 121' and the second gas diffusion layers 120 and 120' may be formed of, for example, carbon sheet. These layers diffuse oxygen and a fuel supplied by the bipolar plates 20 and 20' over the entire surfaces of the catalyst layers 110 and 110'.

The fuel cell 1 including the membrane-electrode assembly 10 operates at a temperature of 100° C. to 200° C. In the fuel cell 1, one bipolar plate 20 is disposed at one side of a catalyst layer and supplies a fuel, such as, for example, hydrogen, to the catalyst layer, and in addition, another bipolar plate 20 is disposed at another side of the catalyst layer and supplies an oxidant, such as, for example, oxygen, to the catalyst layer. In the catalyst layer, hydrogen is oxidized at one side of the catalyst layer to produce protons, and the generated protons are conducted by an electrolyte to reach the other side of the catalyst layer. At the other side of the catalyst layer, the protons and oxygen react together to generate water and electrical energy is produced.

Hydrogen, which is provided as a fuel, can be prepared by modifying a hydrocarbon or alcohol, and oxygen, which is provided as an oxidant, can be provided in the form of air.

In a proton conductive polymer electrolyte according to aspects of the present invention as described above, an electron donor functional group-containing compound is mixed with an aromatic hydrocarbon-based polymer. Accordingly, the proton donor acidic functional group interacts with the electron donor functional group included in an aromatic hydrocarbon polymer, and thus, proton conductivity may be expressed. Therefore, the conductive polymer electrolyte according to aspects of the present invention can be very suitable as an electrolyte for a fuel cell.

In addition, the electron donor functional group-containing compound according to aspects of the present invention is insoluble with respect to water, and thus, is not dissolved in water that is generated when a fuel cell operates, and further, the electron donor functional group-containing compound is not separated from the electrolyte.

Furthermore, if a polyamidic acid derivative is used as the aromatic hydrocarbon polymer, a sulfamic acid group of the polyamidic acid derivative may interact with an electron donor functional group of the electron donor functional group-containing compound to thus express proton conductivity, and the alkyl group of the polyamidic acid derivative may contribute to high flexibility of the formed electrolyte.

Moreover, according to aspects of the present invention, a solid polymer fuel cell operating at an operation temperature from 100° C. to 200° C. in non-humidified conditions or a relative humidity of 50% or less can be obtained, and the solid polymer fuel cell may show high current density, high output power, long lifetime, and stable performance properties. Thus, the solid polymer fuel cell may be very suitable for use in cars, domestic power generators, or mobile devices.

Aspects of the present invention will be described in further detail with reference to the following examples. These examples are for illustrative purposes only and are not intended to limit the scope of the present invention.

Example 1

Synthesis of Polyamidic Acid

A polyamidic acid represented by Formula 1 where Ar is a phenyl group and R is $(CH_2)_{10}$ was synthesized as a precursor of a polyamidic acid derivative.

3.45 g (20 mmol) of 1,10-diaminodecane was dissolved in 170 mL of anhydrous N,N'-dimethylformamide (DMF), and then 4.36 g (20 mmol) of pyromelliticanhydride, which had been recrystallized using acetone and hexane, was slowly added thereto and mixed and reacted at 15° C. for one hour, then at 25° C. for 60 hours, at a constant rotational speed of 700 rpm. The reaction solution was precipitated in 4 L of a mixed solution of acetone and hydrochloric acid in a ratio of 1:4, and filtered and collected. The collected product was washed using 1 mol/L of aqueous hydrochloric acid solution and acetone, and then thermally vacuum-dried at 60° C. for 36 hours. As a result, 7.65 g (Yield: 98%) of polyamidic acid represented by Formula 3 (polyamidic acid 1) was obtained in the form of white powder.

The $^1$H-NMR spectrum of the obtained white powder (DMSO-d6, 500 MHz) included 1.20-1.38 (br, —$CH_2$—), 1.43-1.57 (br, —$CH_2$—), 3.13-3.24 (br, —$CH_2$—), 7.34, 7.68, 8.08 (s, Ph), 8.39, and 8.44 (m, NH). The IR spectrum of the polyamidic acid 1 showed carbonyl group-induced adsorption (1719 cm$^{-1}$, 1655 cm$^{-1}$ (vc=o)).

The obtained polyamidic acid 1 was soluble in DMF, N,N'-dimethylacetamide (DMAc), N-methylpyrrolidone (NMP), and dimethylsulfoxide (DMSO), but was not soluble in water, methanol, chloroform, hexane, benzene and toluene.

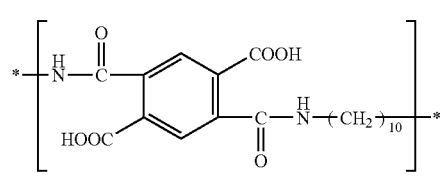

[Formula 3]

Synthesis of Polyamidic Acid Derivative 1.17 g (3 unit mmol) of polyamidic acid 1 prepared as described above was dissolved in 100 mL of an anhydrous DMF, and 1.78 g (15 mmol) of thionyl chloride was slowly dropped thereto in a nitrogen atmosphere and mixed at room temperature for 6 hours to prepare a polymer solution.

Separately, 2.91 g (30 mmol) of a sulfamic acid (Kishida Chemical Product) and 3.03 g (30 mmol) of triethylamine were mixed with 15 mL of anhydrous dichloromethane to generate a sulfamic acid triethylamine salt. Then, the sulfamic acid triethylamine salt was slowly dropped into the polymer solution in a nitrogen atmosphere and then mixed at room temperature for 16 hours.

The solvent in the reaction solution was removed by vacuum-evaporation at 50° C., and then, 100 mL of pure water was added to the resultant product and then mixed at room temperature for one hour. Then, the resultant solution was centrifuged at 4000 rpm for 10 minutes, the supernatant was removed and the remaining solid powder was filtered. The filtered product was dissolved in 100 mL of DMF and then passed through 250 mL of a cation exchange resin (AMBERLYST 15JWET manufactured by Organo Co.) to perform a proton exchanging process.

The treated solution was concentrated to a volume of 10 mL, and then dropped into 200 mL of pure water. The precipitate was filtered and thermal vacuum-dried at 70° C. for one day to obtain 0.68 g (Yield: 42%) of a light brown powder, that is, a polyamidic acid derivative represented by Formula 4 (polyamidic acid derivative 2). In Formula 4, the ratio of a to b was identified through elemental analysis of the sulfur content, and in this case was found to be 9:1. In addition, the average polymerization degree was found to be about 200.

The $^1$H-NMR spectrum (DMSO-d6, 500 MHz) of the obtained light brown powder included 1.20-1.35 (br, —$CH_2$—), 1.49-1.65 (br, —$CH_2$—), 3.20-3.30 (m, —$CH_2$—), and 3.52-3.64 (m, —$CH_2$—), and the IR spectrum of the obtained polyamidic acid derivative 2 showed carbonyl group-induced adsorption (1716 cm$^{-1}$, 1635 cm$^{-1}$ (vc=o)) and sulfamic acid-induced adsorption (1192 cm$^{-1}$, 1055 cm$^{-1}$ (vs=o)).

The polyamidic acid derivative 2 was soluble in DMF, DNAc, NMP, and DMSO, but was not soluble in water, methanol, chloroform, hexane, benzene and toluene.

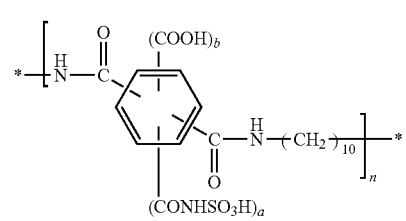

[Formula 4]

0.95 g of the polyamidic acid derivative obtained using the process described above and 0.05 g of the diethyldodecanoic acid amide were dissolved in 9 g of dimethylformamide, and the resultant solution was cast at 60° C. to form a thin brown membrane having a thickness of 50 micrometers. Thereby, a proton conductive polymer electrolyte according to Example 1 was prepared.

Proton Conductivity Test

Figure 3:
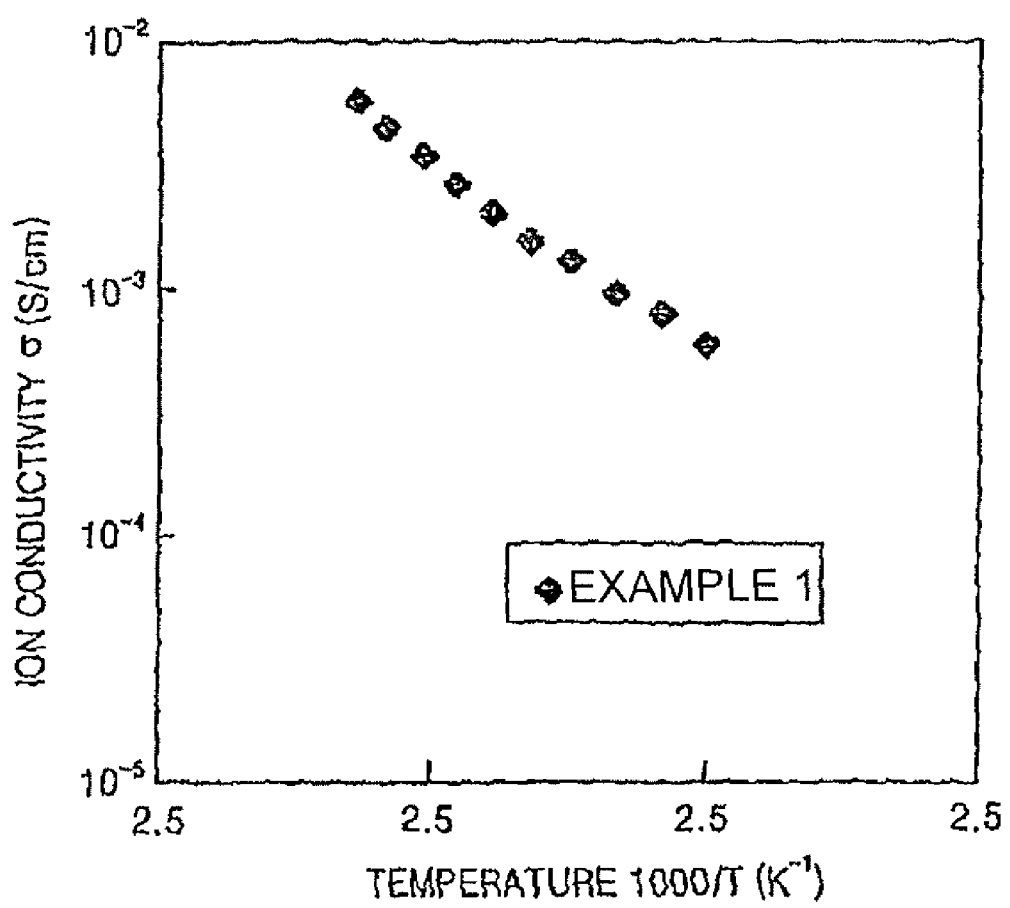
FIG. 3 is a graph of ion conductivity with respect to temperature of an electrolyte prepared according to Example 1.

The proton conductive polymer electrolyte prepared according to Example 1 was inserted into a Pt coin electrode having a diameter of 13 mm, and then complex impedance was measured to obtain ionic conductivity. Dependency of proton conductivity with respect to temperature is illustrated in FIG. 3. Ionic conductivity at 150° C. was $5.8 \times 10^{-3}$ Scm$^{-1}$.

Fuel Cell Test

Carbon powder, in which 50 parts by weight of carbon powder supports Pt, was added to a DMAc solution of the electrolyte prepared according to Example 1 and sufficiently mixed to obtain a suspended solution. The weight ratio of the Pt-supported carbon powder to a proton conductive electrolyte was 2:1 in weight in the solid powder phase. The suspended solution was coated onto a carbon porous substrate (porosity of 75%), and then dried to form a porous electrode for a fuel cell.

Then, the electrolyte prepared according to Example 1 was inserted between a pair of porous electrodes to form a unit cell. Hydrogen was provided as a fuel and air was provided as an oxidant to perform a power generation test at 150° C. As a result, when the open circuit voltage was 0.99V, the voltage measured at a current density of 100 mA/cm$^2$ was 0.589 V.

EXAMPLES 2 THROUGH 7

Other Examples of Electrolytes

Electrolytes according to Examples 1 through 7 were prepared in the same manner as in Example 1, except that the aromatic hydrocarbon polymers (polymer) illustrated in Table 1 were used instead of the polyamidic acid derivative according to Example 1, and electron donor functional group-containing compounds (second component) illustrated in Table 1 were used instead of the diethyldodecanoic acid amide according to Example 1. The aromatic hydrocarbon polymers and electron donor functional group-containing compounds were mixed in a mixture ratio illustrated in Table 1.

Proton conductivities of the obtained electrolytes were measured in the same manner as in Example 1 and the corresponding fuel cells were tested.

The polymers prepared according to Examples 2 and 4 through 7 were the same as the polymer prepared according to Example 1. The polymer prepared according to Example 3 was a yellow powder, and the $^1$H-NMR spectrum (DMSO-d6, 500 MHz) of the obtained yellow powder included 7.02, 7.16, 7.55, and 7.66 (s, Ph), and the IR spectrum of the obtained yellow powder showed a carbonyl group-induced adsorption (1644 cm$^{-1}$ (vc=o)) and a sulfonic acid group-induced adsorption (1222 cm$^{-1}$ (vs=o)). The average polymerization degree was about 250.

The polymer prepared according to Example 3 was soluble in DMF, DNAc, NMP and DMSO, but was not soluble in water, methanol, chloroform, hexane, benzene, and toluene.

The second component used according to Example 7 was Polyethylene Glycol #600 (Mw=600) manufactured by Tokyo Chemical Industry Co., Ltd.

Comparative Example

An electrolyte according to Comparative Example 1 was prepared in the same manner as in Example 1, except that biphenyl was used instead of diethyldodecanoic acid amide, and the biphenyl was added to DMF together with a polyamidic acid derivative shown in Table 1 to prepare a DMF solution, and then the DMF solution was cast onto a glass substrate and then thermally dried at 60° C. The electrolyte according to Comparative Example 1 was a light brown membrane.

TABLE 1

| | electrolyte component | | content of second component [wt %] | proton conductivity [S/cm] (150° C.) | OCV [V] |
|---|---|---|---|---|---|
| | polymer | second component | | | |
| Example 1 | [polyamide structure with CONHSO$_3$H and HO$_3$SHNOC groups, (CH$_2$)$_{10}$ linker] | CH$_3$(CH$_2$)$_{10}$CON(C$_2$H$_5$)$_2$ | 5 | $5.8 \times 10^{-3}$ | 0.990 |
| Example 2 | [polyamide structure with CONHSO$_3$H and HO$_3$SHNOC groups, (CH$_2$)$_{10}$ linker] | CH$_3$(CH$_2$)$_{10}$CON(C$_2$H$_5$)$_2$ | 10 | $4.9 \times 10^{-3}$ | 0.990 |
| Example 3 | [aromatic polymer with phenyl-O-phenyl-O-phenyl-C(=O) repeat unit, SO$_3$H substituent] | CH$_3$(CH$_2$)$_{10}$CON(C$_2$H$_5$)$_2$ | 5 | $9.8 \times 10^{-4}$ | 0.992 |

TABLE 1-continued

| | electrolyte component | | content of second component [wt %] | proton conductivity [S/cm] (150° C.) | OCV [V] |
|---|---|---|---|---|---|
| | polymer | second component | | | |
| Example 4 | [polymer structure: *—N(H)—C(O)—Ar(CONHSO$_3$H)(HO$_3$SHNOC)—C(O)—N(H)—(CH$_2$)$_{10}$—*] | diphenyl ether (Ph—O—Ph) | 5 | 3.3 × 10$^{-3}$ | 0.987 |
| Example 5 | [polymer structure: *—N(H)—C(O)—Ar(CONHSO$_3$H)(HO$_3$SHNOC)—C(O)—N(H)—(CH$_2$)$_{10}$—*] | H$_3$C—(CH$_2$)$_6$—C$_6$H$_4$—C(O)—N(CH$_2$CH$_3$)$_2$ | 5 | 4.2 × 10$^{-3}$ | 0.985 |
| Example 6 | [polymer structure: *—N(H)—C(O)—Ar(CONHSO$_3$H)(HO$_3$SHNOC)—C(O)—N(H)—(CH$_2$)$_{10}$—*] | *—(CH$_2$—CH)—* with C(=O)—N(CH$_3$)$_2$ side group | 5 | 7.5 × 10$^{-4}$ | 0.976 |
| Example 7 | [polymer structure: *—N(H)—C(O)—Ar(CONHSO$_3$H)(HO$_3$SHNOC)—C(O)—N(H)—(CH$_2$)$_{10}$—*] | *—(O—CH$_2$CH$_2$)—* | 5 | 8.4 × 10$^{-4}$ | 0.978 |
| Comp. Example | [polymer structure: *—N(H)—C(O)—Ar(CONHSO$_3$H)(HO$_3$SHNOC)—C(O)—N(H)—(CH$_2$)$_{10}$—*] | biphenyl | 5 | — | — |

As shown in Table 1, the electrolyte prepared according to Examples 2 through 7 and fuel cells including these electrolytes showed high open circuit voltages. In each of these electrolytes, the second component included either an ether group or an amide group as an electron donor functional group to interact with a sulfamide group or sulfone group included in the aromatic hydrocarbon polymer to express high proton conductivity.

On the other hand, the electrolyte prepared according to Comparative Example 1 showed a proton conductivity that was too low to be measured, and a fuel cell including the electrolyte showed an unstable open circuit voltage and very high resistance.

In the electrolyte prepared according to Comparative Example 1, the second component did not include either an ether group or an amide group as an electron donor functional group, and thus, the second component did not interact with the acidic functional group included in the aromatic hydrocarbon polymer and expressed insufficient proton conductivity.

According to aspects of the present invention, a composition including an acidic functional group-containing aromatic hydrocarbon polymer and an electron donor functional group-containing compound is used as an electrolyte of a fuel cell. A fuel cell including such an electrolyte shows high current density, a high output power and a long lifetime even when it operates at an operational temperature from 100° C. to 200° C. in non-humidified conditions or a relative humidity of 50% or less.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A proton conductive polymer electrolyte comprising an acidic functional group-containing aromatic hydrocarbon polymer and an electron donor functional group-containing compound, wherein the acidic functional group-containing aromatic hydrocarbon polymer is a polyamidic acid derivative represented by Formula 1:

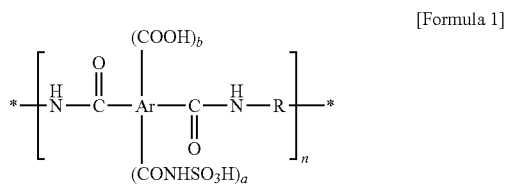

[Formula 1]

where Ar is an aromatic ring or an aromatic ring-containing functional group;

R is a C1-C20 alkylene group;

a and b represent an average per monomer of $CONHSO_3H$ and COOH, respectively, and $0<a\leqq2$ and $0\leqq b<2$ where $a+b=2$; and n denotes an average polymerization degree and is an integer between 100 and 10000.

2. The proton conductive polymer electrolyte of claim 1, wherein the electron donor functional group-containing compound is present in an amount of from 0.01 to 50 parts by weight based on 100 parts by weight of the acidic functional group-containing aromatic hydrocarbon polymer.

3. The proton conductive polymer electrolyte of claim 1, wherein the electron donor functional group-containing compound has a melting point of 100° C. or more and a boiling point of 200° C. or less.

4. The proton conductive polymer electrolyte of claim 1, wherein Ar is a phenyl group or a naphthyl group.

5. The proton conductive polymer electrolyte of claim 1, wherein the electron donor functional group of the electron donor functional group-containing compound is an amide group, an ether group, an amino group, a hydroxyl group, a thioether group, a C1-C20 alkyl group, or a halogen group.

6. The proton conductive polymer electrolyte of claim 1, wherein the electron donor functional group-containing compound is decyl amine, undecyl amine, dodecyl amine, tridecyl amine, tridodecyl amine, pentadecyl amine, decylaniline, 4-butylaniline, 1-decanol, 2-decanol, 1-undecanol, 1-dodecanol, 2-dodecanol, 1-tridecanol, 1-tetradecanol, 2-tetradecanol, 2-hexadecanol, 2-hexyl-1-decanol, heptadecanol, 1,10-decandiol, 1,2-decandiol, 1,12-dodecandiol, 1,2-tetradecandiol, 1,14-tetradecandiol, 1-decanthiol, 1-undecanthiol, or 1-pentadecanthiol.

7. The proton conductive polymer electrolyte of claim 1, wherein the electron donor functional group-containing compound is diethyl dodecanoic acid amide, diethyl octadecanoic acid amide, diethyl benzamide, diethyl-4-heptylbenzamide, diphenylether, ethylphenylether, or cyclohexylphenylether.

8. A fuel cell comprising
a pair of electrodes and
an electrolyte interposed between the electrodes,
wherein the electrolyte is the proton conductive polymer electrolyte of claim 1.

9. The fuel cell of claim 8, wherein at least one of the pair of electrodes includes a binder comprising an acidic functional group-containing aromatic hydrocarbon polymer and an electron donor functional group-containing compound.

10. A fuel cell comprising;
a pair of electrodes and
an electrolyte interposed between the electrodes,
wherein the electrolyte is the proton conductive polymer electrolyte of claim 2.

11. A fuel cell comprising;
a pair of electrodes and
an electrolyte interposed between the electrodes,
wherein the electrolyte is the proton conductive polymer electrolyte of claim 3.

12. A proton conductive polymer electrolyte comprising a mixture of an acidic functional group-containing aromatic hydrocarbon polymer represented by Formula 2 and an electron donor functional group-containing compound,

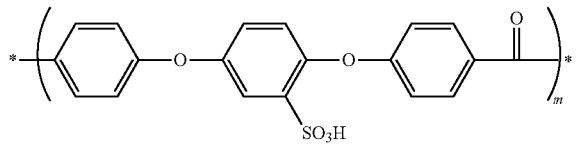

[Formula 2]

wherein m denotes an average polymerization degree and ranges from 100 to 10000.

13. The proton conductive polymer electrolyte of claim 12 for use in non-humidified conditions or conditions of less than 50% relative humidity.

14. The proton conductive polymer electrolyte of claim 12, wherein the electron donor functional group-containing compound is present in an amount of from 0.01 to 50 parts by weight based on 100 parts by weight of the acidic functional group-containing aromatic hydrocarbon polymer.

15. The proton conductive polymer electrolyte of claim 12, wherein the electron donor functional group of the electron donor functional group-containing compound is an amide group, an ether group, an amino group, a hydroxyl group, a thioether group, a C1-C20 alkyl group, or a halogen group.

16. The proton conductive polymer electrolyte of claim 12, wherein the electron donor functional group-containing compound is decyl amine, undecyl amine, dodecyl amine, tridecyl amine, tridodecyl amine, pentadecyl amine, decylaniline, 4-butylaniline, 1-decanol, 2-decanol, 1-undecanol, 1-dodecanol, 2-dodecanol, 1-tridecanol, 1-tetradecanol, 2-tetradecanol, 2-hexadecanol, 2-hexyl-1-decanol, heptadecanol, 1,10-decandiol, 1,2-decandiol, 1,12-dodecandiol, 1,2-tetradecandiol, 1,14-tetradecandiol, 1-decanthiol, 1-undecanthiol, or 1-pentadecanthiol.

17. The proton conductive polymer electrolyte of claim 12, wherein the electron donor functional group-containing compound is diethyl dodecanoic acid amide, diethyl octadecanoic acid amide, diethyl benzamide, diethyl-4-heptylbenzamide, diphenylether, ethylphenylether, or cyclohexylphenylether.

* * * * *